Figure 1:
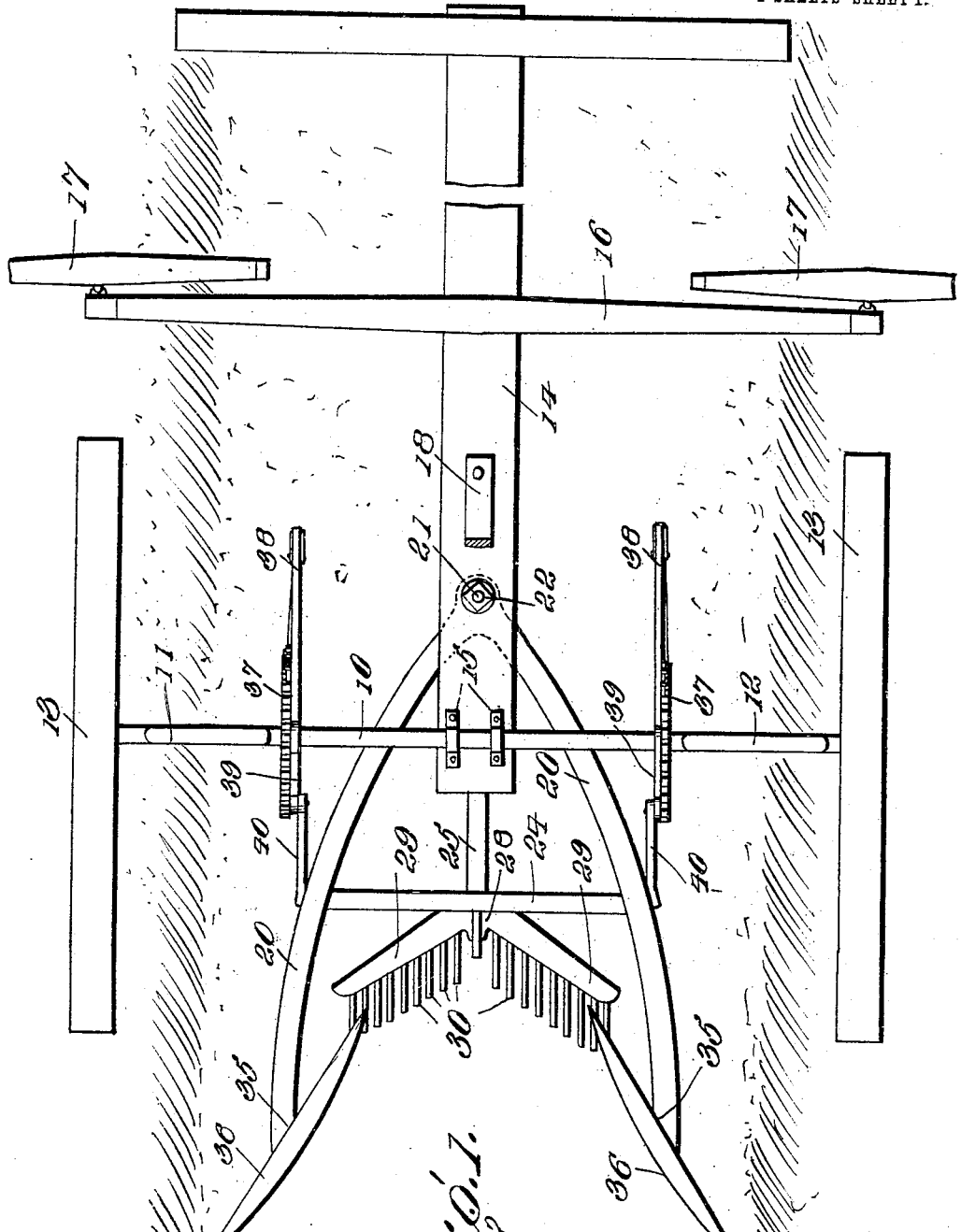

G. GILBERTSON.
CULTIVATOR.
APPLICATION FILED APR. 21, 1910.

979,150.

Patented Dec. 20, 1910.
2 SHEETS—SHEET 1.

Witnesses

Inventor
G. Gilbertson
By
Lacey, Attorneys.

G. GILBERTSON.
CULTIVATOR.
APPLICATION FILED APR. 21, 1910.
979,150.
Patented Dec. 20, 1910.
2 SHEETS—SHEET 2.
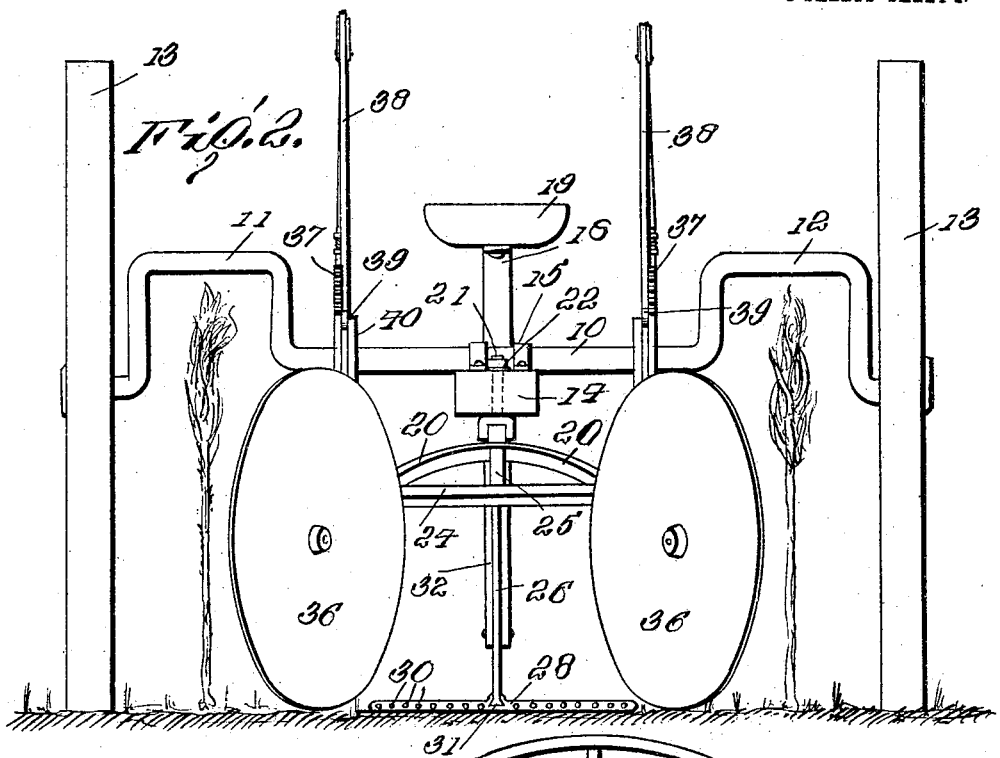
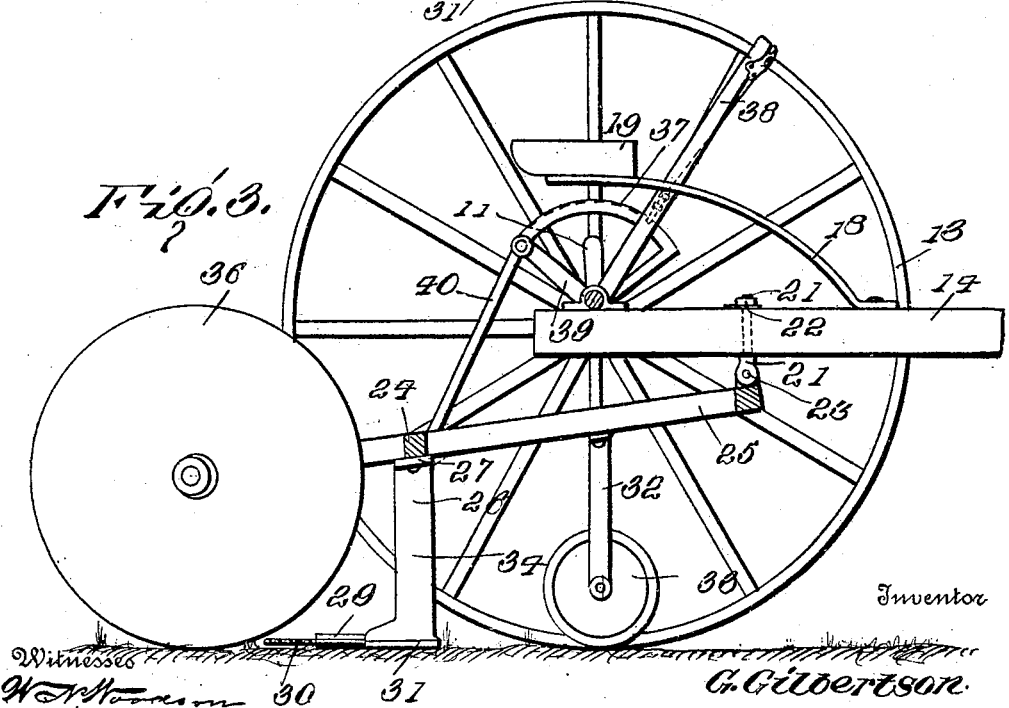

UNITED STATES PATENT OFFICE.

GEORGE GILBERTSON, OF BLOOMFIELD, NEBRASKA.

CULTIVATOR.

979,150.  Specification of Letters Patent.  Patented Dec. 20, 1910.

Application filed April 21, 1910. Serial No. 556,771.

*To all whom it may concern:*

Be it known that I, GEORGE GILBERTSON, a citizen of the United States, residing at Bloomfield, in the county of Knox and State of Nebraska, have invented certain new and useful Improvements in Cultivators, of which the following is a specification.

This invention relates to cultivators, and refers particularly to an implement for breaking sod and clearing weeds accumulating between the rows of corn or other growing crops.

An object of this invention is to provide a skim cultivator with a flat share adapted to loosen and to raise sod and weeds, the flat share being provided with a plurality of spaced and rearwardly extending fingers to break up the sod and the earth supporting the weeds.

The invention further comprehends a skim cultivator provided with a hinged frame for supporting the flat share, and a pair of disks arranged rearwardly on the share, and lifting means on the main frame so as to effect a vertical adjustment of the share and the disks relative to the ground surface and the main supporting frame.

A still further object of this invention is to form a cultivator with a double arched bar to straddle two rows of growing crops, and to adjustably support the hinged frame for operation between the rows.

For a full understanding of the invention and the merits thereof, and to acquire a knowledge of the details of construction, reference is to be had to the following description and accompanying drawings, in which:

Figure 1 is a top plan view of the improved cultivator in position over two rows of growing crops. Fig. 2 is a rear elevation of the same. Fig. 3 is a longitudinal section through the improved cultivator.

Corresponding and like parts are referred to in the following description and indicated in all the views of the drawings by the same reference characters.

Referring to the drawings the numeral 10 designates a double arched bar, the arched portions 11 and 12 being formed adjacent the extremities of the bar. Supporting wheels 13 are suitably connected to the ends of the bar 10 to support the main frame of the cultivator. The frame of the cultivator is provided with a tongue 14 which is secured centrally upon the bar 10. A pair of straps 15 are carried upon the upper face of the tongue 14 and passed over the bar 10. The tongue 14 carries a whiffle-tree 16 extending transversely of the tongue and having at its ends the swingle-trees 17 to which are attached the draft animals for operating the implement. Any arrangement of the whiffle-tree and the swingle-trees may be employed which is found convenient and practical in the use of the implement. The tongue 14 is provided with a spring seat post 18 which is secured to the tongue 14 forwardly of the arched bar 10 and which extends upwardly and backwardly in the well-known manner to support the seat 19.

The main frame is provided with a hinged frame, the same comprising a pair of curved bars 20 which converge at the forward end of the frame and are pivotally supported, for vertical movement, upon an eye bolt 21 extending transversely through the rear end of the tongue 14 forwardly of the attached bar 10. The bolt 21 is held in position by a clamping nut 22 resting upon the upper face of the tongue 14 and carried in threaded relation upon the upper bolt 21. A pivot pin 23 is positioned transversely through the forward ends of the curved bars 20 and the eye-bolt 21. A cross brace 24 is positioned between the curved bars 20 midway between the extremities thereof. A longitudinal brace 25 is positioned centrally within the hinged frame, terminating at its extremities in the forward ends of the curved bars 20 and centrally of the cross brace 24. The cross brace 24 carries a depending standard 26 having oppositely extending flanges 27 at its upper end to seat against the under face of the cross brace 24. The standard 26 depends over the central portion of the hinged frame and supports a flat share 28 upon its lower end. The share 28 is substantially of V-form, the opposite blades 29 of which diverge rearwardly from the lower ends of the standard 26. The share 28 is disposed in a substantially horizontal position and carries a plurality of spaced and rearwardly extending fingers 30. The fingers 30 are secured in the rear edge of the share 28 which is thickened and suitably apertured for the reception thereof. From Fig. 2 of the drawings it will be observed that the standard 26 is provided with a dovetailed tongue 31 fitting into a correspondingly formed groove in the upper face of the share 28 at its central portion.

The longitudinal brace 25 carries a depending arm 32 in the lower end of which is suitably mounted a colter 33. The colter is in direct alinement with the standard 26 and serves the function of cutting the sod or earth prior to the striking of the standard 26 thereagainst. By the cutting the sod and earth is passed oppositely and backwardly over the share 28. The standard 26 is beveled at its opposite sides and at its forward edge to form a forward cutting edge 34 to separate the sod and the earth as it is passed over the share 28.

The rear extremities of the curved bars 20 are beveled inwardly as at 35 to support in angles corresponding to the beveled faces, a pair of disks 36. The disks 36 are diagonally arranged immediately behind the fingers 30 and receive the earth from the fingers, and deflect the same toward the rows of growing plants at the opposite sides of the hinged frame.

The arched bar 10 is provided with a pair of segments 37, which extend upwardly therefrom and in spaced relation at the opposite side of the tongue 14, to carry a pair of hand levers 38 which coöperate with the segments to lock the hinged frame in various adjusted positions. The hand levers 38 are pivoted at their lower ends upon the segments 37, and are provided with rearwardly projecting arms 39 to support the forward end of links 40. The links 40 extend downwardly from the outer ends of the arms 39 and are hinged against the outer faces of the curved bars 20.

It is readily seen that with this construction the hinged frame may be raised or lowered, by the action of the hand levers 38, to dispose the share 28 at the desired depth beneath the ground surface. The wheels 13 travel at the outer sides of the rows of growing crops and the arched portions 11 and 12 receive the plants or stalks thereunder without bending the same. As the implement travels forwardly the colter 33 divides the sod or earth centrally of the implement and the share 28 passes beneath the sod or the earth and raises the same to feed the earth to the fingers 30. As the fingers 30 are spaced, the earth falls between the fingers and is partially overturned and broken up. The earth is delivered from the ends of the share 28 and is received by the disks 36 and deflected toward the opposite sides of the hinged frame.

Having thus described the invention what is claimed as new is:

1. A skim cultivator including a frame adapted to straddle the two rows of growing plants, a hinged frame carried upon said main frame to travel between the rows of growing plants, a flat share depending from the hinged frame, and a pair of disks carried by the hinged frame and rearwardly of the ends of said flat share.

2. A skim cultivator including a frame adapted to straddle rows of growing plants, an adjustable frame hinged to said main frame to travel between the rows of growing plants, a standard depending from the hinged frame midway of its ends and having a forward cutting edge, a flat share carried upon the lower end of said standard and having rearwardly diverging blades, a plurality of spaced fingers rearwardly extending from the share, and a pair of spaced disks upon the rear end of said hinged frame.

3. A cultivator including a main frame, a tongue carried by the frame, an eye bolt depending from the rear extremity of the tongue, a pair of curved bars hinged at their forward ends upon the lower end of the eye bolt a cross brace carried by the curved bars midway of their ends, a longitudinal brace positioned between the forward ends of the curved bars and the central portion of said cross brace, a flat share depending from the central portion of said cross brace, a colter depending from said longitudinal brace and forwardly of the share, and a pair of spaced disks diagonally arranged upon the rear ends of the said curved bars.

4. A cultivator including a main frame, a hinged frame adjustably mounted upon said frame, a flat share depending from said hinged frame, a colter carried centrally upon the hinged frame and forwardly of the share and a pair of spaced disks carried upon the rear extremity of said hinged frame.

5. A cultivator including a double arched bar, wheels carried on the ends of said bar for supporting the same, a tongue mounted centrally upon the bar, an eye bolt depending from the rear end of the tongue, a pair of curved bars hinged upon the eye bolt for vertical movement and diverging rearwardly therefrom, segments carried upon the arched bar at the opposite sides of the tongue, hand levers pivoted upon the segments, arms extending from the lower ends of the hand levers, links carried by the arms and pivotally connected to said bars to vertically adjust the same, a cross brace carried by the curved bars midway of their ends, a longitudinal brace disposed between the forward ends of said curved bars and the central portion of said cross brace, a flat share depending from the central portion of said cross brace, a colter arranged upon the longitudinal brace forwardly of said share and a pair of spaced disks carried upon the extremities of said curved bars.

6. A cultivator including a double arched bar adapted to straddle two rows of growing plants, wheels on the ends of the bar to support the same, a tongue carried by the bar at its central portion, a hinged frame adjustably disposed upon the rear end of the tongue to travel between the rows of growing plants, a share depending from the central portion of the hinged frame and having oppositely extending blades, spaced and horizontal fingers rearwardly projecting from said share, a pair of spaced disks carried at the rear end and at the sides of the hinged frame forwardly of said share.

7. A cultivator including a frame, a colter on the frame to cut sod, a flat share on the frame behind the colter to separate the cut sod, horizontal blades carried on the share for raising the sod, spaced fingers extending rearwardly from the blades for breaking up the sod, and spaced disks disposed in angular relation upon the frame for deflecting the broken earth toward the rows of plants at the sides of the frame.

In testimony whereof, I affix my signature in presence of two witnesses.

GEORGE GILBERTSON. [L. S.]

Witnesses:
H. J. MILLER,
C. T. HECKT.